United States Patent
Sekigawa et al.

(10) Patent No.: US 12,349,263 B2
(45) Date of Patent: Jul. 1, 2025

(54) SUPPRESSION OF ACCUMULATED ELECTRIC CHARGES OF A VEHICLE BODY

(71) Applicant: TOYOTA JIDOSHA KABUSHIKI KAISHA, Aichi-ken (JP)

(72) Inventors: Yuya Sekigawa, Toki (JP); Toshio Tanahashi, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 148 days.

(21) Appl. No.: 18/454,792

(22) Filed: Aug. 24, 2023

(65) Prior Publication Data
US 2024/0090107 A1 Mar. 14, 2024

(30) Foreign Application Priority Data
Sep. 13, 2022 (JP) .................................. 2022-144985

(51) Int. Cl.
*H05F 3/00* (2006.01)
*B60R 16/06* (2006.01)

(52) U.S. Cl.
CPC .............. *H05F 3/00* (2013.01); *B60R 16/06* (2013.01)

(58) Field of Classification Search
CPC .................................. H05F 3/00; B60R 16/06
USPC ........................................................ 361/217
See application file for complete search history.

(56) References Cited

U.S. PATENT DOCUMENTS

| | | | | |
|---|---|---|---|---|
| 4,513,347 A | * | 4/1985 | Wilcox ...................... | H05F 3/02 361/220 |
| 4,625,257 A | * | 11/1986 | Lissner ...................... | H05F 3/02 361/212 |
| 10,507,749 B1 | * | 12/2019 | Dickerman ............. | B60R 16/06 |
| 2004/0012499 A1 | * | 1/2004 | Giesel ............... | B60R 21/01534 340/425.5 |
| 2011/0250384 A1 | | 10/2011 | Sumi et al. | |
| 2015/0245454 A1 | * | 8/2015 | Steinberg .................. | H05F 3/00 156/245 |
| 2017/0057389 A1 | * | 3/2017 | Dickerman ............. | B60N 2/70 |
| 2020/0010036 A1 | * | 1/2020 | Haramoto ............... | B60R 16/06 |
| 2022/0073022 A1 | * | 3/2022 | Sakurai ................... | B60R 16/06 |

FOREIGN PATENT DOCUMENTS

| | | | |
|---|---|---|---|
| JP | 2008-050508 A | 3/2008 | |
| JP | 2013-163499 A | 8/2013 | |
| JP | 2020-009643 A | 1/2020 | |
| JP | 2021-079923 A | 5/2021 | |
| WO | WO-2009053121 A1 * | 4/2009 | ............. B32B 27/12 |
| WO | 2010/050242 A1 | 5/2010 | |

OTHER PUBLICATIONS

Kawai Shizuo; Electrosatic Induction and Discharge Device; Entire abstract and specification and drawings (Year: 1993).*
NPL (Year: 1993).*

* cited by examiner

*Primary Examiner* — Dharti H Patel
(74) *Attorney, Agent, or Firm* — HAUPTMAN HAM, LLP

(57) ABSTRACT

A vehicle includes a cover member provided in a trunk compartment of a vehicle body, and a flannel cloth arranged between an outer surface of the cover member and a rear floor panel. The flannel cloth is arranged so as to cover an entire region of the rear floor panel that faces the outer surface of the cover member.

17 Claims, 6 Drawing Sheets

SUPPRESSION OF ACCUMULATED ELECTRIC CHARGES OF A VEHICLE BODY

CROSS REFERENCE TO RELATED APPLICATION

This application claims priority to Japanese Patent Application No. 2022-144985 filed on Sep. 13, 2022, which is incorporated herein by reference in its entirety including the specification, claims, drawings, and abstract.

TECHNICAL FIELD

The present disclosure relates to suppression of accumulated electric potential of a vehicle body.

BACKGROUND

It is conventionally known that positive electrostatic charges accumulate on a vehicle due to external factors, including travel of the vehicle body on a road surface from which the vehicle body is maintained in an insulated state, and that such positive electrostatic charges accumulated on the vehicle impart some influence on driving of the vehicle. As a measure against accumulation of such positive electrostatic charges on a vehicle, there has been proposed a method of eliminating electric charges from a static elimination target by emitting negative ions generated by a negative ion generator toward the static elimination target (for example, see JP 2020-9643 A).

Although the technique described in JP 2020-9643 A serves to suppress the influence of positive electrostatic charges accumulated on a vehicle, there is still room for improvement in terms of suppressing accumulation of positive electrostatic charges over a large area of a vehicle body.

In light of the above, the present disclosure is directed to effectively suppressing accumulated electric potential of a vehicle body.

SUMMARY

A vehicle according to an aspect of the present disclosure is a vehicle including: a charge accumulating member provided inside a vehicle body; and a charge accumulation prevention sheet, which is arranged between an outer surface of the charge accumulating member and the vehicle body, and which covers the vehicle body. The charge accumulation prevention sheet is arranged so as to cover an entire facing part of the vehicle body that faces the outer surface of the charge accumulating member.

According to the above configuration, it is possible to inhibit charges accumulated on the charge accumulating member from causing charge accumulation on the vehicle body, and accumulated electric potential of the vehicle body can thereby be effectively suppressed. Further, it is possible to allow the vehicle to exhibit its inherent control performance and also its inherent aerodynamic performance.

In the vehicle according to an aspect of the present disclosure, the charge accumulating member may be mounted over and in proximity to a constituent member of the vehicle body, and the charge accumulation prevention sheet may be sandwiched between the constituent member and the charge accumulating member so as to cover the entire surface of the constituent member that faces the outer surface of the charge accumulating member.

According to the above configuration, it is possible to inhibit charges accumulated on the charge accumulating member from causing charge accumulation on the constituent member mounted in proximity to the charge accumulating member, so that accumulated electric potential of the constituent member can be effectively suppressed. Further, it is possible to suppress charge accumulation on the constituent member caused by friction between the charge accumulating member and the constituent member, and accumulated electric potential of the vehicle body can thereby be suppressed.

In the vehicle according to an aspect of the present disclosure, the constituent member may be a rear floor panel of a trunk compartment located at a rear part of the vehicle body, and the charge accumulating member may be a resin foam cover plate mounted over the rear floor panel.

According to the above configuration, it is possible to inhibit charges accumulated on the resin foam cover plate from causing accumulation of positive electrostatic charges on the rear floor panel, and accumulated electric potential of the vehicle body can thereby be suppressed.

In the vehicle according to an aspect of the present disclosure, the charge accumulating member may be arranged by being spaced from a constituent member of the vehicle body, and the charge accumulation prevention sheet may be arranged between the constituent member and the charge accumulating member by being spaced from the constituent member and in contact with the charge accumulating member, so as to cover the entire surface of the constituent member that faces the outer surface of the charge accumulating member.

According to the above configuration, it is possible to inhibit charges accumulated on the charge accumulating member from causing charge accumulation on the constituent member, and accumulated electric potential of the vehicle body can thereby be suppressed.

In the vehicle according to an aspect of the present disclosure, the vehicle may include a floor panel of a vehicle cabin and a seat attached onto the floor panel. The constituent member may be the floor panel, and the charge accumulating member may be a resin foam cushion constituting the seat.

According to the above configuration, it is possible to inhibit charges accumulated on the resin foam cushion from causing accumulation of positive electrostatic charges on the floor panel, and accumulated electric potential of the vehicle body can thereby be suppressed.

In the vehicle according to an aspect of the present disclosure, the charge accumulation prevention sheet may be composed of natural fibers having an electric potential close to zero in a triboelectric series. Further, the charge accumulation prevention sheet may have moisture-retaining property and air permeability.

Furthermore, the charge accumulation prevention sheet may be composed of flannel cloth, cotton fabric, or Japanese paper.

Since the charge accumulation prevention sheet is composed of such a common material, accumulated electric potential of the vehicle body can be suppressed by a simple configuration.

According to the present disclosure, accumulated electric potential of a vehicle body can be effectively suppressed.

BRIEF DESCRIPTION OF DRAWINGS

Embodiment(s) of the present disclosure will be described based on the following figures, wherein.

DESCRIPTION OF EMBODIMENTS

A vehicle 100 according to an embodiment will now be described by reference to the drawings. An arrow FR, an arrow UP, and an arrow RH shown in each drawing respectively indicate the front direction, the upward direction, and the right direction of the vehicle 100. Further, directions opposite to the arrows FR, UP, and RH are respectively the rear direction, the downward direction, and the left direction. In the following, when description is given by referring simply to front/rear, left/right, and upward/downward directions, unless otherwise specified, those directions denote the front/rear, left/right, and upward/downward directions of the vehicle 100.

Figure 1:
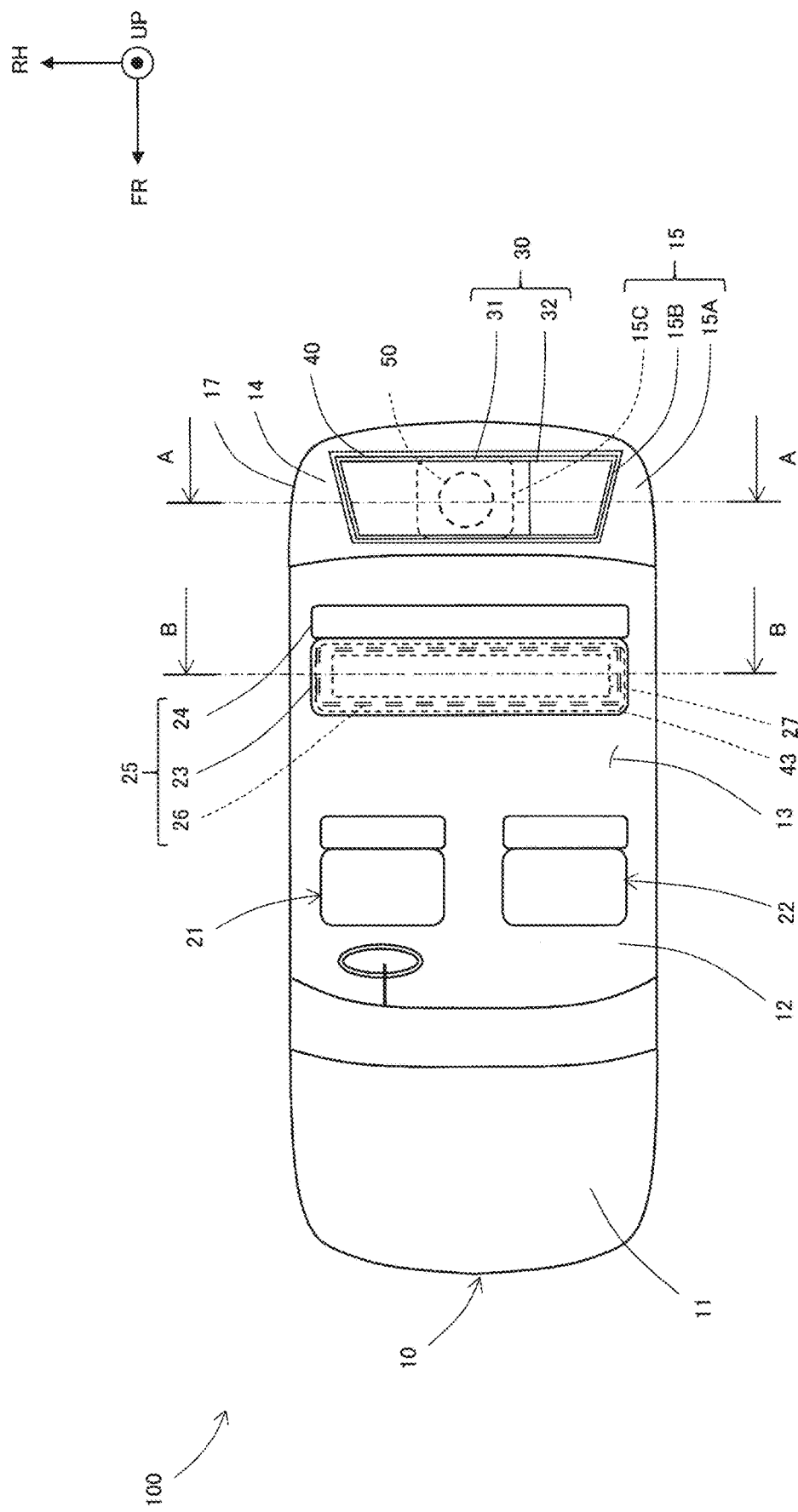
FIG. 1 is a plan view of a vehicle according to an embodiment, in which a roof and a rear hood of a trunk compartment are removed so that the interior of a vehicle cabin and a trunk compartment is visible.

As shown in FIG. 1, a vehicle body 10 of the vehicle 100 comprises a front compartment 11, a vehicle cabin 12, and a trunk compartment 14. The front compartment 11 is located at a front part of the vehicle body 10, and is an internal space for housing drive units such as an engine and a motor.

The vehicle cabin 12 is arranged at a central part of the vehicle body 10, and is the space occupied by the driver and passengers on board. Inside the vehicle cabin 12, a driver's seat 21, a passenger seat 22, and a rear seat 25 are arranged. It is noted that FIG. 1 is a view in which a roof is removed so that the interior of the vehicle cabin 12 is visible.

The trunk compartment 14 is arranged at a rear part of the vehicle body, and is the space in which luggage is held. The trunk compartment 14 is covered with a rear hood, which is not shown in drawing. The rear hood is such that its front end portion is pivotably mounted to the vehicle body 10, and is configured to open and close the trunk compartment 14 by having its rear end portion being moved upward and downward. It is noted that FIG. 1 is a view in which the rear hood is removed so that the interior of the trunk compartment 14 is visible.

Figure 2:
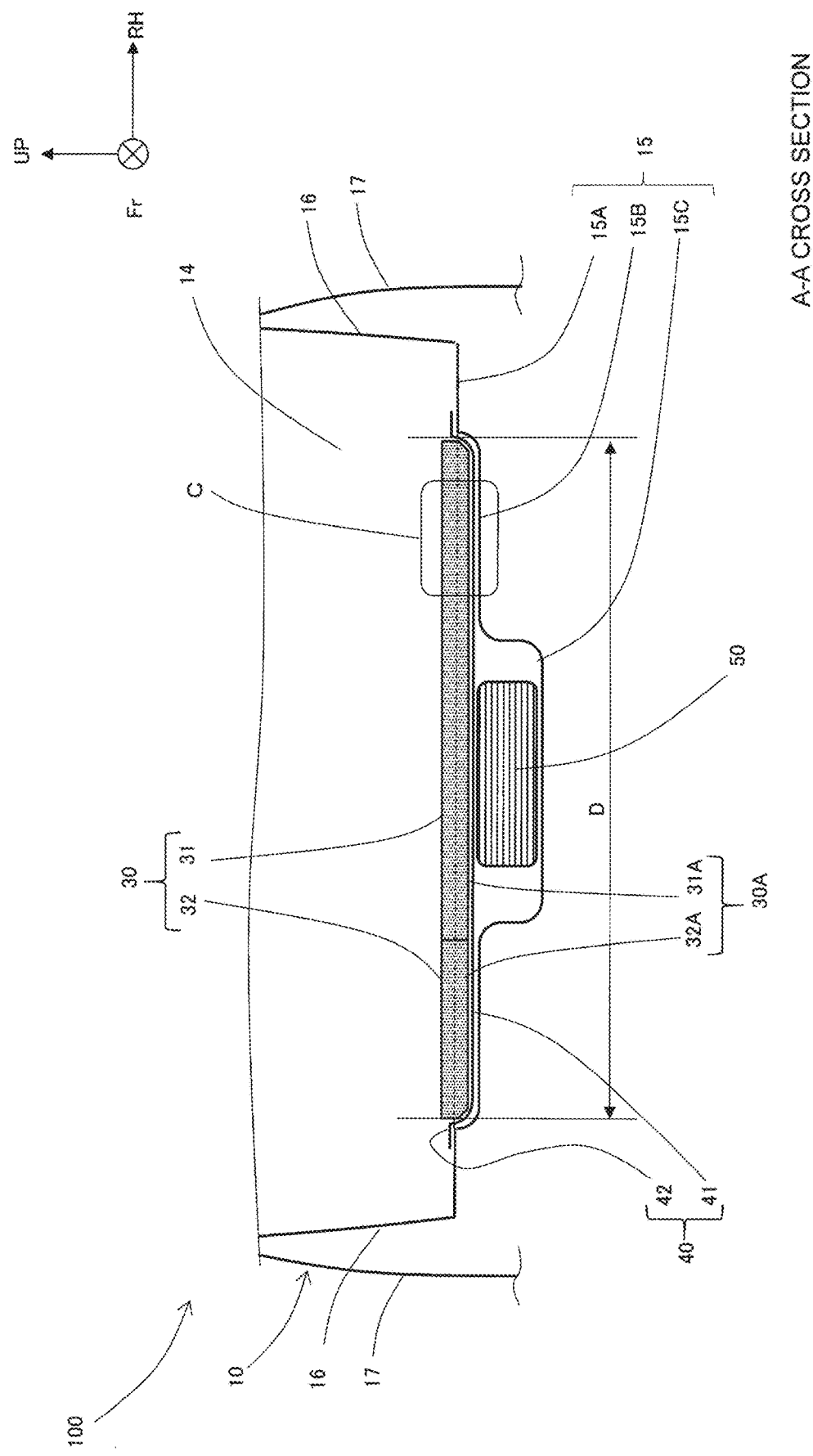
FIG. 2 is a cross-sectional view of the trunk compartment of the vehicle shown in FIG. 1, depicting a cross section taken along line A-A shown in FIG. 1.

Next, the detailed structure of the trunk compartment 14 will be described by reference to FIGS. 1 and 2. As shown in FIG. 2, the trunk compartment 14 comprises a rear floor panel 15, which is a constituent member of the vehicle body 10. The rear floor panel 15 is a metal plate member. The rear floor panel 15 is composed of flat plate portions 15A located at both ends in the vehicle width direction, a recessed portion 15C located at the center in the vehicle width direction, and step portions 15B (i.e., a left step portion and a right step portion) located between the respective left and right flat plate portions 15A and the recessed portion 15C. The flat plate portions 15A are connected to lower end portions of side walls 16 of the trunk compartment 14. On the outside, in the vehicle width direction, of the side walls 16, outer panels 17 are mounted, which constitute design faces on respective sides of the trunk compartment 14. The recessed portion 15C is the space in which a spare tire 50 is held. The step portions 15B are regions somewhat recessed from the flat plate portions 15A located outward of the step portions 15B, and have a recess depth less than that of the recessed portion 15C. Over a region extending from the right step portion 15B to a right end part (i.e., a part near the recessed portion 15C) of the left step portion 15B, a right cover plate 31 is mounted. The right cover plate 31 also covers over the recessed portion 15C. Further, over a region where the left step portion 15B is located, a left cover plate 32 is mounted. The right cover plate 31 and the left cover plate 32 are thick plate-shaped charge accumulating members made of resin foam, and constitute a cover plate 30. A region D, where the step portions 15B and the recessed portion 15C are located and which faces a lower outer surface 31A of the right cover plate 31 and a lower outer surface 32A of the left cover plate 32, constitutes a facing part of the vehicle body 10 that faces an outer surface 30A of the cover plate 30.

A main portion 41 of a flannel cloth 40, which is a charge accumulation prevention sheet, is interposed between the right cover plate 31 and the step portion 15B, between the left cover plate 32 and the step portion 15B, and between the spare tire 50 held in the recessed portion 15C and the right cover plate 31. A peripheral portion 42 of the flannel cloth 40 somewhat extends out of the step portions 15B onto the flat plate portions 15A. With this arrangement, the flannel cloth 40 covers the entire region D having located therein the surfaces of the step portions 15B and the recessed portion 15C that face the lower outer surface 30A of the cover plate 30. Although FIG. 2 shows the region D extending in the vehicle width direction, likewise in the vehicle longitudinal direction, the flannel cloth 40 covers the entire surfaces of the step portions 15B, the recessed portion 15C, and the spare tire 50 that face the lower outer surface 30A of the cover plate 30.

Figure 3:
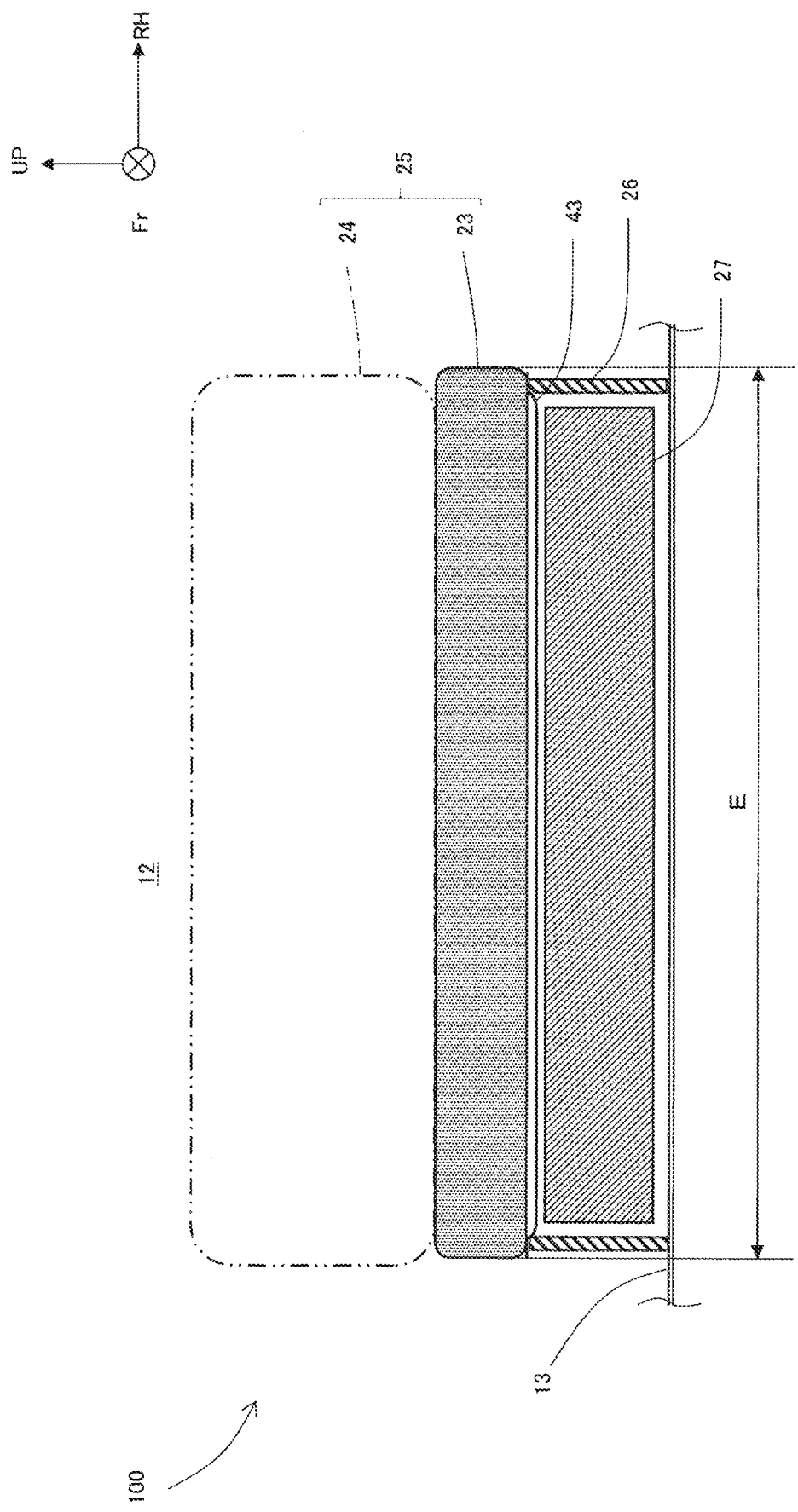
FIG. 3 is a cross-sectional view of the vehicle cabin of the vehicle shown in FIG. 1, depicting a cross section taken along line B-B shown in FIG. 1.

Next, the detailed structure of the rear seat 25 will be described by reference to FIGS. 1 and 3. The rear seat 25 comprises a frame 26 attached onto a floor panel 13, a cushion 23 attached onto the frame 26, and a backrest 24. The floor panel 13 is a metal plate member, and is a constituent member of the vehicle body 10. The cushion 23 is a charge accumulating member made of resin foam. On the inside of the frame 26, a battery 27 for driving the motor is housed. A flannel cloth 43 is arranged between the lower surface of the cushion 23 and the upper surface of the battery 27, and between the lower surface of the cushion 23 and the frame 26. As such, the flannel cloth 43 is arranged between the floor panel 13 and the cushion 23 and between the lower surface of the cushion 23 and the frame 26 by being spaced from the floor panel 13 and in contact with the lower outer surface of the cushion 23. Further, the flannel cloth 43 is arranged to cover a region E of the floor panel 13 that faces the entire lower outer surface of the cushion 23. Although FIG. 3 shows the region E extending in the vehicle width direction, likewise in the vehicle longitudinal direction, the flannel cloth 43 covers the part of the floor panel 13 that faces the entire lower outer surface of the cushion 23.

Figure 4:
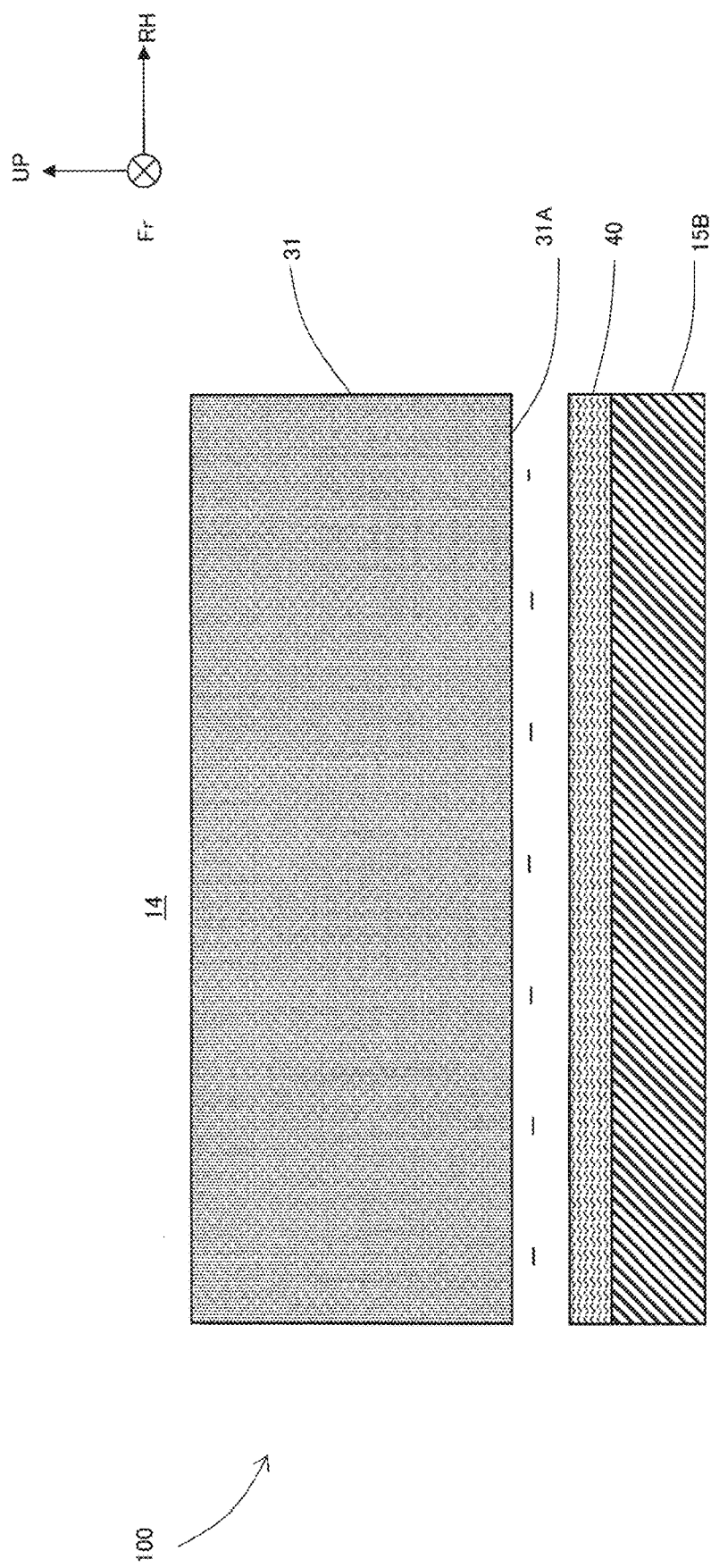
FIG. 4 is an enlarged schematic view illustrating a rear floor, a flannel cloth, and a cover plate shown in FIG. 2, and is a detailed view of a portion C in FIG. 2.

Next, the working and effect of the flannel cloth 40 provided in the trunk compartment 14 will be described by reference to FIG. 4. When the vehicle 100 travels, charges are accumulated on the resin foam cover plate 30, on which charges tend to be accumulated due to external factors such as high-voltage electric power lines. At that time, as shown in FIG. 4, negative electrostatic charges are accumulated on the outer surface 31A of the right cover plate 31. Although the reason as to how accumulated electric potential of the vehicle body 10 is maintained at zero potential by providing the flannel cloth 40 is not clarified in detail, absorption of electromagnetic waves by the flannel cloth 40 having moisture-retaining property and air permeability is considered to be the reason, as explained below.

The flannel cloth 40 is composed of natural fibers having an electric potential close to zero in a triboelectric series. Further, the flannel cloth 40 has moisture-retaining property and air permeability. The flannel cloth 40 covers the step portion 15B facing the lower outer surface 31A of the right cover plate 31. With this arrangement, the flannel cloth 40 suppresses electrostatic induction between the right cover plate 31 and the adjacently-located step portion 15B. As a result, charge accumulation on the step portion 15B caused by negative electrostatic charges accumulated on the right cover plate 31 is suppressed. Similarly, the flannel cloth 40 covers the recessed portion 15C facing the outer surface 31A of the right cover plate 31, and also covers the step portion 15B facing the outer surface 32A of the left cover plate 32. As such, the flannel cloth 40 covers the entire surfaces of the step portions 15B and the recessed portion 15C that face the lower outer surface 30A of the cover plate 30. With this arrangement, charge accumulation on the rear floor panel 15 caused by charges accumulated on the outer surface 30A of the cover plate 30 is suppressed. Accordingly, it is possible to suppress accumulation of positive electrostatic charges on the entire rear floor panel 15, and accumulated electric potential of the vehicle body 10 can thereby be suppressed. Further, the flannel cloth 40 can inhibit charge accumulation on the step portion 15B caused by friction between the right cover plate 31 and the step portion 15B. In this way, the flannel cloth 40 can effectively maintain accumulated electric potential of the vehicle body 10 at zero potential.

Figure 5:
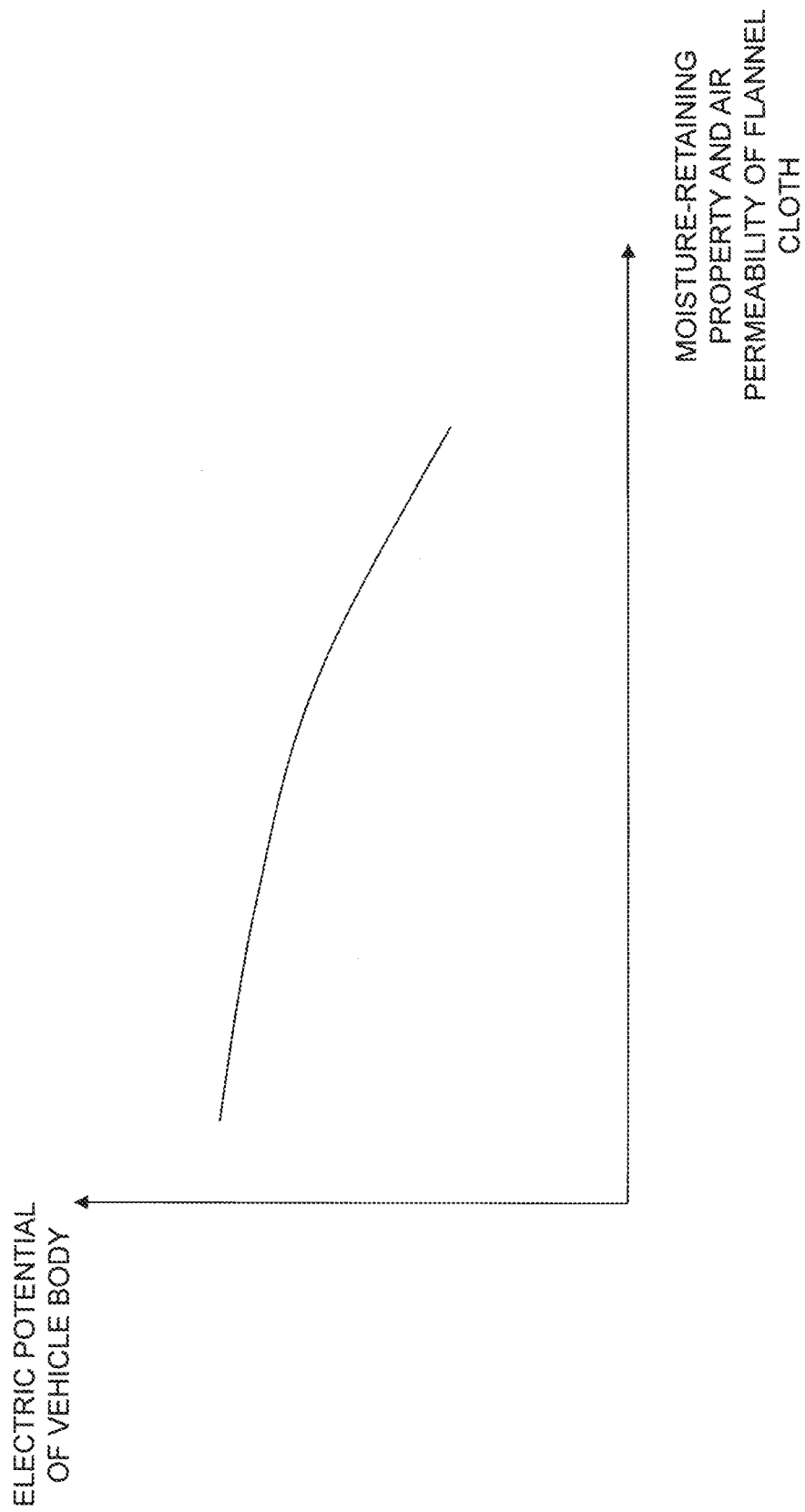
FIG. 5 is a graph showing a relationship of moisture-retaining property and air permeability of the flannel cloth with respect to electric potential of a vehicle body.

Further, according to studies conducted by the present inventors, it has been confirmed that, as shown in FIG. 5, electric potential of the vehicle body 10 decreases when moisture-retaining property and air permeability of the flannel cloth 40 are increased. From this, it can be understood that in order to obtain the above-described effect, it is necessary that the flannel cloth 40 has moisture-retaining property and air permeability.

Figure 6:
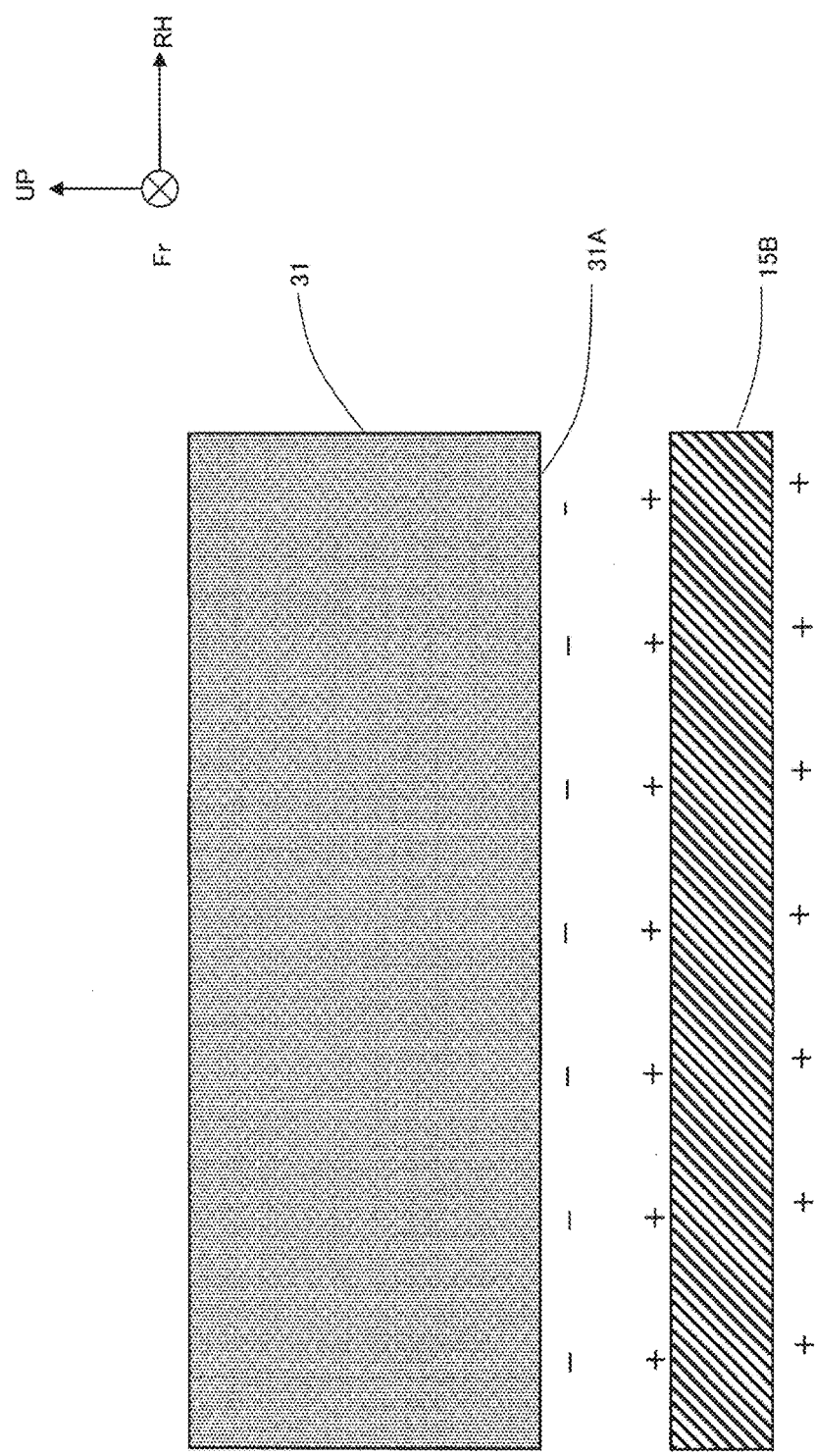
FIG. 6 is an enlarged schematic view showing a rear floor and a cover plate according to conventional art.

In contrast to the above, in the case of a conventional-art vehicle 110 in which the flannel cloth 40 is not provided, electric potential of the vehicle body 10 increases as shown in FIG. 6. The reason for this is also not clarified in detail, but is considered to be as explained below.

Due to negative electrostatic charges accumulated on the right cover plate 31, electrostatic induction occurs over the air layer between the right cover plate 31 and the step portion 15B, and positive electrostatic charges accumulate on the step portion 15B. For this reason, electric potential of the vehicle body 10 increases in the conventional-art vehicle 110. In contrast, in the vehicle 100 of the present embodiment, since the flannel cloth 40 suppresses electrostatic induction in the rear floor panel 15 caused by the cover plate 30, accumulated electric potential of the vehicle body 10 can be maintained at zero potential.

Further, the flannel cloth 43 attached to the rear seat 25 is arranged so as to cover the entire surface of the floor panel 13 that faces the entire lower outer surface of the cushion 23. With this arrangement, electrostatic induction between the cushion 23 and the floor panel 13 is suppressed. As a result, it is possible to suppress charge accumulation on the floor panel 13 caused by charges accumulated on the cushion 23, and accumulated electric potential of the vehicle body 10 can be maintained at zero potential.

In the vehicle 100 of the present embodiment, since accumulated electric potential of the vehicle body 10 can effectively be maintained at zero potential by means of the flannel cloths 40, 43 as described above, it is possible to inhibit accumulated electric potential of the vehicle body 10 from affecting control systems and sensors, and inherent control performance of the vehicle 10 can thereby be exhibited. Further, in the vehicle 100, since it is possible to suppress accumulation of positive electrostatic charges on an outer surface of the vehicle body 10, generation of separated flow at the surface of the vehicle body 10 can be suppressed, so that inherent aerodynamic performance of the vehicle 100 can be exhibited, and fuel consumption can be improved.

Although it has been described above that the charge accumulation prevention sheet is composed of the flannel cloth 40, the material is not limited thereto so long as the material is natural fibers having an electric potential close to zero in a triboelectric series and has moisture-retaining property and air permeability. For example, the charge accumulation prevention sheet may be composed of cotton fabric, Japanese paper, or the like. Further, as the charge accumulation prevention sheet, it is possible to use a cloth obtained by impregnating a cotton towel fabric with a laundry softener or the like containing a surfactant. In that case, electromagnetic wave absorption performance of the cloth is enhanced by the effect of the surfactant, and it is thereby possible to inhibit charges accumulated on the charge accumulating member from causing charge accumulation on the constituent member of the vehicle body 10.

Further, although it has been described above that the flannel cloth 43 is arranged underneath the cushion 23 of the rear seat 25, the arrangement is not limited thereto, and the flannel cloth 43 may be arranged underneath respective cushions of the driver's seat 21 and the passenger seat 22. With this arrangement, it is possible to inhibit charges accumulated on the cushions of the driver's seat 21 and the passenger seat 22 from causing charge accumulation on the floor panel 13, and accumulated electric potential of the vehicle body 10 can thereby be reduced. Accordingly, it is possible to allow the vehicle 100 to effectively exhibit its inherent control performance and aerodynamic performance.

The invention claimed is:

1. A vehicle, comprising:
a charge accumulating member provided inside a vehicle body; and
a charge accumulation prevention sheet, which is arranged between an outer surface of the charge accumulating member and the vehicle body, and which covers the vehicle body, wherein
the charge accumulation prevention sheet is arranged so as to cover an entire facing part of the vehicle body that faces the outer surface of the charge accumulating member,
the charge accumulating member is mounted over and in proximity to a constituent member of the vehicle body,
the charge accumulation prevention sheet is sandwiched between the constituent member and the charge accumulating member so as to cover an entire surface of the constituent member that faces the outer surface of the charge accumulating member,
the constituent member is a rear floor panel of a trunk compartment located at a rear part of the vehicle body, and the charge accumulating member is a resin foam cover plate mounted over the rear floor panel.

2. A vehicle, comprising:
a charge accumulating member provided inside a vehicle body;
a charge accumulation prevention sheet, which is arranged between an outer surface of the charge accumulating member and the vehicle body, and which covers the vehicle body;
a floor panel of a vehicle cabin; and
a seat attached onto the floor panel,
wherein
the charge accumulation prevention sheet is arranged so as to cover an entire facing part of the vehicle body that faces the outer surface of the charge accumulating member,
the charge accumulating member is arranged by being spaced from a constituent member of the vehicle body,
the charge accumulation prevention sheet is arranged between the constituent member and the charge accumulating member by being spaced from the constituent member and in contact with the charge accumulating member, so as to cover an entire surface of the constituent member that faces the outer surface of the charge accumulating member,
the constituent member is the floor panel, and
the charge accumulating member is a resin foam cushion constituting the seat.

3. The vehicle according to claim 2, wherein
the charge accumulation prevention sheet is composed of natural fibers having an electric potential close to zero in a triboelectric series.

4. The vehicle according to claim 3, wherein
the charge accumulation prevention sheet has moisture-retaining property and air permeability.

5. The vehicle according to claim 3, wherein
the charge accumulation prevention sheet is composed of flannel cloth, cotton fabric, or Japanese paper.

6. A vehicle, comprising:
a charge accumulating member provided inside a vehicle body; and
a charge accumulation prevention sheet, which is arranged between an outer surface of the charge accumulating member and the vehicle body, and which covers the vehicle body, wherein
the charge accumulation prevention sheet is arranged so as to cover an entire facing part of the vehicle body that faces the outer surface of the charge accumulating member,
the charge accumulation prevention sheet is composed of natural fibers having an electric potential close to zero in a triboelectric series.

7. The vehicle according to claim 6, wherein
the charge accumulation prevention sheet has moisture-retaining property and air permeability.

8. The vehicle according to claim 6, wherein
the charge accumulation prevention sheet is composed of flannel cloth, cotton fabric, or Japanese paper.

9. The vehicle according to claim 6, wherein
the charge accumulating member is mounted over and in proximity to a constituent member of the vehicle body, and
the charge accumulation prevention sheet is sandwiched between the constituent member and the charge accumulating member so as to cover an entire surface of the constituent member that faces the outer surface of the charge accumulating member.

10. The vehicle according to claim 9, wherein
the constituent member is a rear floor panel of a trunk compartment located at a rear part of the vehicle body, and
the charge accumulating member is a resin foam cover plate mounted over the rear floor panel.

11. The vehicle according to claim 10, wherein
the charge accumulation prevention sheet has moisture-retaining property and air permeability.

12. The vehicle according to claim 10, wherein
the charge accumulation prevention sheet is composed of flannel cloth, cotton fabric, or Japanese paper.

13. The vehicle according to claim 9, wherein
the charge accumulation prevention sheet has moisture-retaining property and air permeability.

14. The vehicle according to claim 9, wherein
the charge accumulation prevention sheet is composed of flannel cloth, cotton fabric, or Japanese paper.

15. A vehicle, comprising:
a charge accumulating member provided inside a vehicle body; and
a charge accumulation prevention sheet, which is arranged between an outer surface of the charge accumulating member and the vehicle body, and which covers the vehicle body, wherein
the charge accumulation prevention sheet is arranged so as to cover an entire facing part of the vehicle body that faces the outer surface of the charge accumulating member,
the charge accumulating member is arranged by being spaced from a constituent member of the vehicle body,
the charge accumulation prevention sheet is arranged between the constituent member and the charge accumulating member by being spaced from the constituent member and in contact with the charge accumulating member, so as to cover an entire surface of the constituent member that faces the outer surface of the charge accumulating member, and
the charge accumulation prevention sheet is composed of natural fibers having an electric potential close to zero in a triboelectric series.

16. The vehicle according to claim 15, wherein
the charge accumulation prevention sheet has moisture-retaining property and air permeability.

17. The vehicle according to claim 15, wherein
the charge accumulation prevention sheet is composed of flannel cloth, cotton fabric, or Japanese paper.

* * * * *